United States Patent
Stanford-Jason et al.

(10) Patent No.: US 11,032,630 B2
(45) Date of Patent: Jun. 8, 2021

(54) CAPTURING AND PROCESSING SOUND SIGNALS FOR VOICE RECOGNITION AND NOISE/ECHO CANCELLING

(71) Applicant: XMOS LTD, Bristol (GB)

(72) Inventors: Andrew Stanford-Jason, Salisbury (GB); Hendrik Lambertus Muller, Cumbria (GB)

(73) Assignee: XMOS Ltd, Bristol (GB)

( * ) Notice: Subject to any disclaimer, the term of this patent is extended or adjusted under 35 U.S.C. 154(b) by 0 days.

(21) Appl. No.: 16/345,273

(22) PCT Filed: Oct. 19, 2017

(86) PCT No.: PCT/EP2017/076673
§ 371 (c)(1),
(2) Date: Apr. 26, 2019

(87) PCT Pub. No.: WO2018/077713
PCT Pub. Date: May 3, 2018

(65) Prior Publication Data
US 2019/0297407 A1      Sep. 26, 2019

(30) Foreign Application Priority Data
Oct. 26, 2016   (GB) .................................... 1618112

(51) Int. Cl.
*H04R 1/08* (2006.01)
*G06F 3/16* (2006.01)
(Continued)

(52) U.S. Cl.
CPC ............. *H04R 1/083* (2013.01); *G06F 3/167* (2013.01); *G10L 15/22* (2013.01);
(Continued)

(58) Field of Classification Search
None
See application file for complete search history.

(56) References Cited

U.S. PATENT DOCUMENTS 5,027,306 A  *  6/1991  Dattorro ............ H03H 17/0227
                                                    708/313
9,807,492 B1 *  10/2017  Campbell ........... G10L 21/0208
(Continued)

FOREIGN PATENT DOCUMENTS

EP        2 852 057 A1     3/2015
WO     2012/161825 A1    11/2012

OTHER PUBLICATIONS

See Merriam-Webster (https://www.merriam-webster.com/dictionary/dependence) (retrieved Jul. 17, 2020) (Year: 2020).*
(Continued)

*Primary Examiner* — Walter F Briney, III
(74) *Attorney, Agent, or Firm* — Sughrue Mion, PLLC (57) ABSTRACT

A system comprising a microphone arranged to capture sound from an environment, and an ultrasound emitter configured to emit an emitted ultrasound signal into an environment. The microphone is arranged to capture a received audio signal from the environment, comprising a component in the human audible range. The microphone is also arranged to capture a received ultrasound signal comprising reflections of the emitted ultrasound signal, or else the system comprises another, co-located microphone arranged to capture the received ultrasound signal. Either way, the system further comprises a controller implemented in software or hardware or a combination thereof, wherein the controller is configured to process the received audio signal in dependence on the received ultrasound signal.

14 Claims, 4 Drawing Sheets

(51) Int. Cl.
  *G10L 15/22*     (2006.01)
  *G10L 21/0208*   (2013.01)
  *G10L 25/84*     (2013.01)

(52) U.S. Cl.
  CPC .......... *G10L 21/0208* (2013.01); *G10L 25/84* (2013.01); *G10L 2015/226* (2013.01)

(56) References Cited

U.S. PATENT DOCUMENTS

| | | | |
|---|---|---|---|
| 2008/0095401 A1* | 4/2008 | Saleh | G01S 3/808 382/103 |
| 2011/0242305 A1 | 10/2011 | Peterson et al. | |
| 2012/0224456 A1* | 9/2012 | Visser | G01S 15/86 367/127 |
| 2013/0129102 A1* | 5/2013 | Li | H04M 9/082 381/71.1 |
| 2013/0332156 A1* | 12/2013 | Tackin | H04M 1/6041 704/226 |
| 2015/0261495 A1 | 9/2015 | Smus et al. | |
| 2015/0279369 A1 | 10/2015 | Lee et al. | |
| 2018/0018965 A1* | 1/2018 | Daley | G06F 3/017 |

OTHER PUBLICATIONS

Tom Barker et al., "Ultrasound-coupled semi-supervised nonnegative matrix factorisation for speech enhancement", 2014 IEEE International Conference on Acoustics, Speech and Signal Processing (ICASSP), IEEE, May 4, 2014, pp. 2129-2133, XP032617066.

Kaustubh Kalgaonkar et al., "Ultrasonic Doppler Sensor for Voice Activity Detection", IEEE Signal Processing Letters, IEEE Service Center, Piscataway, NJ, US, Oct. 1, 2007, pp. 754-757, vol. 14, No. 10, XP011192049.

British Search Report of Application No. GB1618112.5 dated Mar. 31, 2017.

International Search Report of PCT/EP2017/076673 dated Jun. 5, 2018 [PCT/ISA/210].

Written Opinion of PCT/EP2017/076673 dated Jun. 5, 2018 [PCT/ISA/237].

* cited by examiner

CAPTURING AND PROCESSING SOUND SIGNALS FOR VOICE RECOGNITION AND NOISE/ECHO CANCELLING

TECHNICAL FIELD

The present disclosure relates to the use of a microphone to capture sound from an environment such as a room, e.g. in order to detect voice commands from a user.

BACKGROUND

A PDM (pulse density modulation) microphone is a microphone that outputs its captured sound signal as a series of 1-bit samples, with the time density of the 1s or 0s representing the captured waveform. A PDM microphone typically outputs a signal at a high sample rate which is a multiple of the final sample rate to be used. I.e. the signal is downsampled from the original PDM sampling rate to a lower sample rate. The reason for this is to reduce the processing complexity incurred in processing the signal in subsequent processing stages. For example a 3,072,000 Hz PDM signal may be output by the microphone, which is divided down by a factor of 192 to produce a 16,000 Hz audio signal. Prior to downsampling, the signal is also low pass filtered (or band pass filtered). Otherwise, if a signal containing unwanted higher frequency content or noise is downsampled to a sample rate too low to represent that higher frequency content or noise (the content/noise is higher frequency than the Nyquist limit of half the sample rate), then it is liable to cause aliasing in the downsampled signal. Hence prior to downsampling, all frequencies above the Nyquest limit of half the final sampling rate should preferably be filtered out to prevent aliasing into the passband.

Typically this filtering and downsampling is performed in stages, wherein at each stage high frequencies are removed in order to produce a signal that faithfully reproduces the audio signal. The reason for the multiple stages is that the computational complexity of a low pass filter (in terms of processing cycles incurred) increases the lower the cut-off frequency, and also increases with the sample rate. Hence it incurs a lower computational complexity to first low-pass filter to an intermediate frequency (incurring only the complexity of an intermediate cut-off frequency at the high sample rate), then to downsample to an intermediate sample rate, and then to low-pass filter and downsample again (now incurring only the complexity of low pass filtering down to the lower cut-off frequency at the intermediate sample rate, as opposed to the higher sample rate).

An example use of a microphone such as a PDM microphone is to detect speech commands from a user, for instance to control a user device such as a television, set-top box, smartphone, tablet or smart watch. PDM microphones are often preferred for use in consumer products such as televisions, set-top boxes, smartphones and tablets, etc., since they give a moderate quality while being relatively cheap and small. With a train of only 1-bit samples being output by the microphone, then it requires only a 1-bit analogue-to-digital converter (ADC), i.e. a sigma-delta modulator; whereas an output signal formed of, say, 24-bit samples would require a very high frequency ADC (which would incur a high complexity to implement).

For the final captured audio to be useful, it often needs to be post-processed. This post processing may, for example, involve one or more of the following steps.

Acoustic echo cancellation (AEC): a known signal that was present in the room is subtracted from the captured audio, including all its echoes. For example, the audio produced by a smart TV may be removed from the captured stream in order for the smart TV to capture voice commands.

Dereverb: reverb components in the captured signal are removed. For example, the signal may be a person speaking some distance from the microphone, and echoes will be generated from walls, ceilings and other surfaces that create an unnecessarily rich audio signal.

Noise reduction: stationary noise is removed from the signal.

Wake-up word detection: a wake-up word may be recognised to trigger some action, e.g. waking up a device such as a smart TV from a standby state to begin listening for further voice commands or queries.

Direction of arrival estimation: the system works out where the signal is originating from.

After pre-processing, the signal is used; for example by transmitting it to a far-end terminal in the case of a voice call conducted via a speaker phone, or by passing it to a natural language processing system to recognize a voice command in the signal. In the latter case, a wake-up word can be used so as to only process utterances that appear to be intended for the system.

SUMMARY

Normally in such applications, the downsampler stage or stages are used to pick out only the audio component of the signal and throw away the rest. However, it is recognized herein that extra information could be provided to help with audio processing operations such as echo cancellation, wake-up word recognition, noise suppression and/or direction-of-arrival estimation. Particularly, the inventors have recognized than when processing signals in the human audible range, such as to recognize a voice command, estimate direction of arrival, or cancel echo or noise, then the ultrasound component can in fact provide useful information to inform the processing of the audio signal.

Accordingly, the present invention provides a system comprising a microphone arranged to capture sound from an environment, and an ultrasound emitter configured to emit an emitted ultrasound signal into an environment. The microphone is arranged to capture a received audio signal from the environment, comprising a component in the human audible range. The microphone is also arranged to capture a received ultrasound signal comprising reflections of the emitted ultrasound signal, or else the system comprises another, co-located microphone arranged to capture the received ultrasound signal. Either way, the system further comprises a controller implemented in software or hardware or a combination thereof, wherein the controller is configured to process the received audio signal in dependence on the received ultrasound signal.

According to one aspect disclosed herein, there is provided a system comprising: an ultrasound emitter configured to emit an emitted ultrasound signal into an environment; sound sensing equipment comprising a microphone or more than one co-located microphone, wherein at least one of the one or more microphones of said sound sensing equipment is arranged to capture from said environment a received audio signal comprising a component in a human audible range, and wherein at least one of said one or more microphones of the sound sensing equipment is arranged to capture a received ultrasound signal comprising reflections of the emitted ultrasound signal; and a controller configured to perform operations of: (a) monitoring for one or more predetermined wake-up words in the received audio signal; (b) waking up a target device from a standby state in response to a positive detection of at least one of the one or more wake-up words; and (c) performing a gesture detection process, by using the ultrasound signal to detect the reflections of the emitted ultrasound signal and thereby detect user gestures performed by a user in said environment; wherein the controller is configured to declare the positive detection of the at least one wake-up word at least partially in dependence on being accompanied by a user gesture as detected based on said gesture detection process.

According to another aspect disclosed herein, there is provided an ultrasound emitter configured to emit an emitted ultrasound signal into an environment; sound sensing equipment comprising a microphone or more than one co-located microphone, wherein at least one of the one or more microphones of said sound sensing equipment is arranged to capture from said environment a received audio signal comprising a component in a human audible range, and wherein at least one of the one or more microphones of the sound sensing equipment is arranged to capture a received ultrasound signal comprising reflections of the emitted ultrasound signal; and a controller configured to perform operations of: (A) applying a noise model in order to remove ambient noise from the received audio signal, the noise model modelling noise ambient noise originating from said environment; (B) performing a motion detection process, by using the received ultrasound signal to detect the reflections of the emitted ultrasound and based thereon to detect motion in the environment; (C) performing a noise classification to classify whether or not the received audio signal currently consists only of ambient noise, by classifying the received audio signal as ambient noise at least partially in dependence on not being accompanied by motion in the environment as detected based on said motion detection process; and (D) training the noise model based on the received audio signal during periods when the received audio signal is classified as ambient noise according to said noise classification, but supressing the training during periods when the received audio signal is not classified as ambient noise according to said noise classification.

According to another aspect disclosed herein, there is provided an ultrasound emitter configured to emit an emitted ultrasound signal into an environment; sound sensing equipment comprising a microphone or more than one co-located microphone, wherein at least one of the one or more microphones of said sound sensing equipment is arranged to capture from said environment a received audio signal comprising a component in a human audible range, and wherein at least one of the one or more microphones of the sound sensing equipment is arranged to capture a received ultrasound signal comprising reflections of the emitted ultrasound signal; and a controller configured to perform operations of: (i) applying an echo model in order to remove echoes of the sound source from the received audio signal, thereby producing an echo-cancelled version of the received audio signal, the echo model modelling an echo response of said environment; (ii) when the echo-cancelled version of the audio signal diverges from quiescence, performing an echo response classification to classify whether or not the divergence is due to a change in the echo response of the environment, by classifying the divergence as being due to a change in the echo response at least partially in dependence on being accompanied by a change in the reflections of the emitted ultrasound signal received in the received ultrasound signal; and (iii) training the echo model based on the received audio signal during periods when the divergence is classified as being due to the as due to a change in the echo response according to said echo response classification, but supressing the training during periods when the divergence is classified as not due to a change in the echo response according to said echo response classification.

According to another aspect disclosed herein, there is provided an ultrasound emitter configured to emit an emitted ultrasound signal into an environment; sound sensing equipment comprising a microphone or more than one co-located microphone, at least one of which is a directional microphone comprising an array of sound sensing elements, wherein at least one of the one or more microphones of said sound sensing equipment is arranged to capture from said environment an audio signal comprising a component in a human audible range, and wherein the directional microphone is arranged to capture a received ultrasound signal comprising reflections of the emitted ultrasound signal; and a controller configured to perform operations of: (I) based on the array of sound sensing elements, determining a direction of arrival of the received ultrasound signal; and (II) determining a direction of arrival of the received audio signal at least partially based on the direction of arrival of the received ultrasound signal.

In embodiments, the microphone arranged to capture the received ultrasound signal is the same microphone as that arranged to capture the received audio signal. Alternatively, different but co-located microphones of the sound sensing equipment may be used to capture the received audio signal and the received ultrasound signal respectively.

Preferably, the same front-end is re-used to capture both the ultrasound and audio signals, rather than requiring separate microphones.

According to another aspect disclosed herein, there is provided a system comprising: an ultrasound emitter arranged to emit an emitted ultrasound signal into an environment, and a microphone arranged to provide an input signal (either directly or via a preliminary filter such as a preliminary decimator stage). The input signal represents sound captured from said environment, including an audio component in a human audible range and an ultrasound component comprising reflections of the emitted ultrasound signal. The system further comprises: an audio filter arranged to receive and filter the input signal, by passing a first frequency range comprising the audio component but filtering out higher frequencies, thereby producing a received audio signal representing the audio component; and an ultrasound filter arranged to receive and filter an instance of the same input signal derived from the same microphone as the audio filter, by passing a second frequency range comprising the ultrasound component but filtering out lower frequencies including at least the audio component, thereby producing a received ultrasound signal representing the ultrasound component. Furthermore, the system comprises a controller configured to process the received audio signal, wherein the controller is configured to use the received ultrasound signal to assist in the processing of the received audio signal.

In embodiments, the audio filter may take the form of an audio decimator which is also arranged to downsample the input signal to an audio sampling frequency retaining the first frequency range but not higher frequencies, thereby producing said received audio signal at the audio sampling frequency.

In embodiments, the ultrasound filter may also be arranged to filter out frequencies higher than the second frequency range.

In embodiments, the ultrasound filter may take the form of an ultrasound decimator which is also arranged to downsample the input signal to an ultrasound sampling frequency retaining the second frequency range but not higher frequencies, thereby producing said received ultrasound signal at the ultrasound sampling rate.

In embodiments, the ultrasound filter may have a configurable pass band.

In embodiments, the input signal may initially include frequencies higher than the second frequency range, comprising high frequency noise; and the system may comprise a preliminary filter arranged to filter the input signal before input to the audio and ultrasound filters, by passing the first and second frequency ranges but to filter out at least some of the high frequency noise.

In embodiments, the preliminary filter may take the form of a preliminary decimator which is also arranged to downsample the input signal to an initial downsampled sampling frequency before input to the audio and ultrasound filters, the initial downsampled sampling frequency retaining said first and second frequency ranges but not a higher frequency range comprising at least some of said high frequency noise.

In embodiments, the processing which the controller is configured to perform with the assistance of the ultrasound signal may comprise: identifying speech in the received audio signal, and controlling a target device in dependence on the identified speech.

In embodiments, the processing which the controller is configured to perform with the assistance of the ultrasound signal may comprise: processing the received audio signal to be transmitted as part of a voice call.

In embodiments, the processing which the controller is configured to perform with the assistance of the ultrasound signal may comprises: monitoring for one or more predetermined wake-up words in the received audio signal; waking up a target device from a standby state in response to a positive detection of at least one of the one or more wake-up words; and performing a gesture detection process, by using the ultrasound signal to detect the reflections of the emitted ultrasound signal and thereby detect user gestures performed by a user in said environment; wherein the controller may be configured to declare the positive detection of the at least one wake-up word at least partially in dependence on being accompanied by a user gesture as detected based on said gesture detection process.

In embodiments, said system may be incorporated in the target device.

In embodiments, the target device may take the form of one of: a television set or set-top box, a smart household appliance, a mobile user terminal, a desktop computer, a server, or a robot.

In embodiments, the target device may be arranged to run a virtual digital assistant or to access a virtual digital assistant hosted on a server, and the waking-up of the target device from the standby state may comprise waking up the virtual digital assistant such that the virtual digital assistant will respond to further voice commands or queries detected in the audio signal.

In embodiments, the processing which the controller is configured to perform with the assistance of the ultrasound signal may comprise: applying a noise model in order to remove ambient noise from the received audio signal, the noise model modelling ambient noise originating from said environment; performing a motion detection process, by using the received ultrasound signal to detect the reflections of the emitted ultrasound and based thereon to detect motion in the environment; performing a noise classification to classify whether or not the received audio signal currently consists only of ambient noise, by classifying the received audio signal as ambient noise at least partially in dependence on not being accompanied by motion in the environment as detected based on said motion detection process; and training the noise model based on the received audio signal during periods when the received audio signal is classified as ambient noise according to said noise classification, but supressing the training during periods when the received audio signal is not classified as ambient noise according to said noise classification.

In embodiments, the system may further comprise a sound source, and the processing which the controller is configured to perform with the assistance of the ultrasound signal may comprise: applying an echo model in order to remove echoes of the sound source from the received audio signal, thereby producing an echo-cancelled version of the received audio signal, the echo model modelling an echo response of said environment; when the echo-cancelled version of the audio signal diverges from quiescence, performing an echo response classification to classify whether or not the divergence is due to a change in the echo response of the environment, by classifying the divergence as being due to a change in the echo response at least partially in dependence on being accompanied by a change in the reflections of the emitted ultrasound signal received in the received ultrasound signal; and training the echo model based on the received audio signal during periods when the divergence is classified as being due to the as due to a change in the echo response according to said echo response classification, but supressing the training during periods when the divergence is classified as not due to a change in the echo response according to said echo response classification.

In embodiments, the microphone may take the form of a directional microphone comprising an array of sound sensing elements, and wherein the processing which the controller is configured to perform with the assistance of the ultrasound signal may comprise: based on the array of sound sensing elements, determining a direction of arrival of the received ultrasound signal; and determining a direction of arrival of the received audio signal at least partially based on the direction of arrival of the received ultrasound signal.

According to another aspect disclosed herein, there is provided a computer program product embodied on a computer-readable storage medium and arranged so as when run on one or more processing units to perform the operations of the controller.

According to another aspect disclosed herein, there is provided a method comprising performing the operations of the ultrasound emitter, the microphone or sound sensing equipment, and the controller.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

Figure 1:
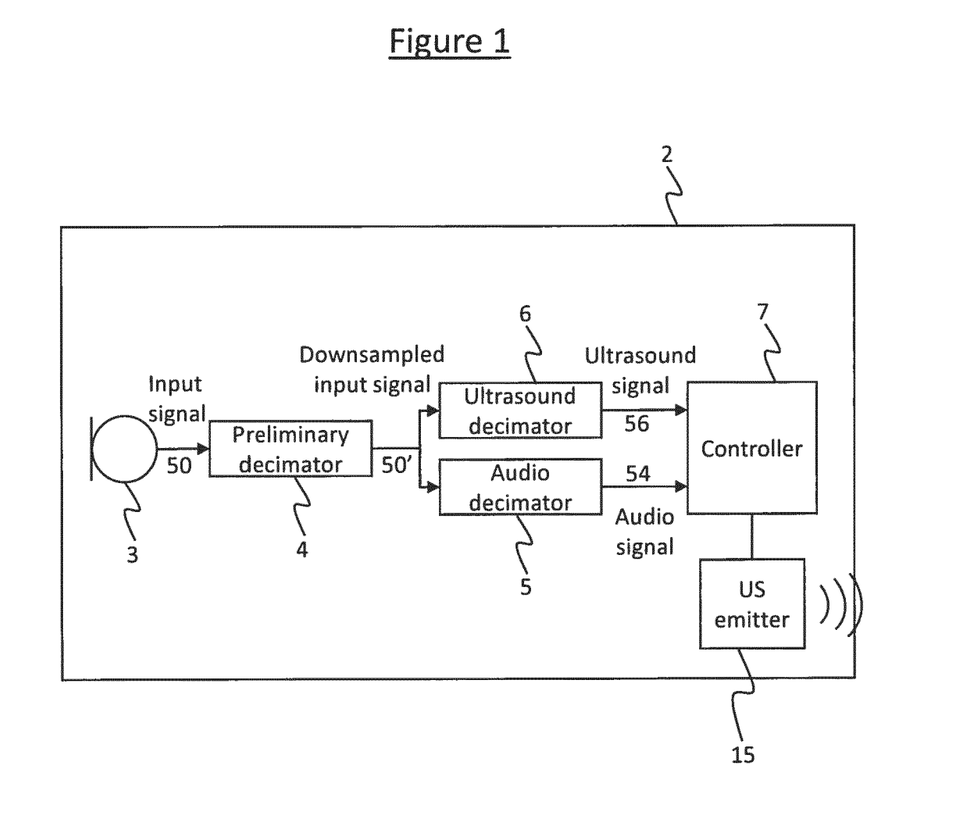
FIG. 1 is a schematic block diagram of a system for capturing audio and ultrasound signals.

FIG. 1 illustrates a system for capturing an audio signal and an ultrasound signal and processing the audio signal in dependence on the ultrasound signal, in accordance with embodiments of the present invention.

The system comprises: an ultrasound emitter 15, a microphone 3, a first stage filter in the form of a first stage decimator (preliminary decimator) 4, an audio filter in the form of an audio decimator 5, an ultrasonic filter in the form of an ultrasonic decimator 6, and a controller 7. The microphone 3 has an output coupled to an input of the preliminary decimator 4. The preliminary decimator 4 has an output coupled to an input of the audio decimator 5, and also to an input of the ultrasound decimator 6. Each of the audio decimator 5 and the ultrasound decimator 6 has an output coupled to an input of the controller 7. The controller 7 is also coupled to the ultrasound emitter 15. In embodiments, the controller 7 is arranged to control a target device 2. For instance the target device 2 may take the form of a smart television (TV) set or set-top box, or another type of smart home appliance such as a voice controlled stereo or oven. As another example the target device 2 may take the form of a mobile user terminal such as a smartphone, tablet or smartwatch, or a static user terminal such as a desktop computer. In another example, the target device may even take the form of a robot, e.g. a household robot such as a robotic assistant or pet.

In embodiments the controller 7, ultrasound decimator 6, audio decimator 5, preliminary decimator 4, microphone 3 and ultrasound emitter 15 may be integrated inside the housing of the target device 2 (e.g. TV set). In particular embodiments, all of these components may be integrated in the target device 2.

Any one or more or all of the controller 7, ultrasound decimator 6, audio decimator 5 and preliminary decimator 4 may be implemented in software stored on a memory comprising one or more units employing one or more memory media (e.g. EEPROM or magnetic storage), and arranged to run on a processor comprising one or more processing units. Alternatively any one or more or all of the controller 7, ultrasound decimator 6, audio decimator 5 and preliminary decimator 4 may be implemented partially or wholly in dedicated hardware circuitry, or configurable or reconfigurable hardware circuitry such as a programmable gate array (PGA) or field programmable gate array (FPGA).

In embodiments, one, some or all of the controller 7, ultrasound decimator 6, audio decimator 5 and preliminary decimator 4 may be implemented in software stored on an embedded memory incorporated in the target device 2 and arranged to run on one or more embedded processing units incorporated in the target device 2 (e.g. smart TV).

Alternatively it is not excluded that one, some or all of these components may be implemented externally to the target device 2. E.g. an external microphone 3 and/or external ultrasound emitter 15 could be used, and/or some or all of the functionality of the controller 7 and/or filters 4, 5, 6 could be implemented on one or more external devices. For instance the microphone 3, controller 7 and/or filters 4, 5, 6 could be implemented in an app running on a mobile device smartphone, tablet or smartwatch; or the controller 7 and/or filters 4, 5, 6 could be implemented on a remote server (a server as referred to herein comprising one or more server units at one or more geographical sites).

Wherever implemented, the ultrasound emitter 15 is arranged to emit a predetermined ultrasound signal comprising a predetermined ultrasound pattern or signature. For instance the pattern to be emitted may be generated by the controller 7 and supplied from the controller 7 to the ultrasound emitter 15 to be emitted therefrom in the form of ultrasound. The ultrasound emitter 15 is arranged to emit the predetermined ultrasound signal out into an environment such as a room of a building (e.g. a user's living room). For example the predetermined ultrasound signal may comprise a predetermined sequence of ultrasound pulses. In embodiments the emitted ultrasound signal may be emitted at a specific, predetermined narrowband ultrasound frequency.

The microphone 3 is arranged to capture sound from the same environment as that into which the ultrasound emitter emits the ultrasound signal. The microphone 3 generates a digital input signal 50 representing the captured sound in digital form, at a certain initial sampling rate. As will be familiar to a person skilled in the art, the range of frequencies that a digital signal can convey is limited by the Nyquist limit, which is an upper limit of half the sampling rate. In the present case, the input signal is generated by the microphone 3 with a high enough sampling rate to retain both audio (in the human audible range) and ultrasound (above the human audible range). Particularly, the sampling rate of the input signal 50 is high enough to capture reflections of the ultrasound signal emitted by the ultrasound emitter 15, as reflected from one or more objects and/or surfaces in the environment (e.g. room).

In embodiments the microphone 3 takes the form of a pulse density modulation (PDM) microphone. A PDM microphone comprises a 1-bit analogue to digital converter (sigma delta modulator), arranged to convert the analogue signal generated by the microphone into a stream of 1-bit digital samples (the digital input signal 50). In a quiescent state the input signal 50 generated by the PDM microphone 3 takes the form of an alternating sequence of 1s and 0s (010101010 . . . ). Then when the microphone is excited by acoustic activity in the environment (whether audible or ultrasound), this sequence varies such that the density of 1s (or equivalently the density of 0s) represents the acoustic waveform of the captured sound. In embodiments, the microphone 3 is a PDM microphone configured to produce the raw input signal 50 at a sample rate of about 3 MHz (e.g. 3,072,000 Hz).

A sample rate of the order of MHz will incur a high computational complexity to process (i.e. a high number of processing cycles or operations). A sample rate this high is also unnecessary for most applications. Therefore in embodiments the input signal 50 received from the PDM microphone 3 is downsampled to a lower sample rate, but one that is still high enough according to the Nyquist limit to convey the audio or ultrasound content that is to be processed. However, a signal with a sample rate of the order of MHz is liable to include high frequency noise, such as sigma-delta modulator noise from the ADC of the PDM microphone 3. If bluntly downsampled, this noise will cause aliasing in the downsampled signal. For instance, say a signal with a 3840,000 Hz sample rate comprises two sinusoids, one at 1000 Hz and one at 100,000 Hz. If one was to bluntly subsample this at 48,000 Hz (e.g. by taking every eighth sample), then the 1000 Hz signal would still be there as usual, but the 100,000 Hz signal would be aliased and folded down into 4,000 Hz signal (100,000 modulo 48,000). I.e. the high frequency signal will have been converted to an unwanted low frequency signal. Hence the raw input signal 50 should preferably be filtered to extract only the desired frequency band before downsampling. I.e. the signal to be downsampled should preferably always first be filtered to remove frequencies above the Nyquist frequency (above 24,000 Hz in the above example).

The preliminary decimator 4 comprises a preliminary downsampler arranged to divide the input PDM signal 50 generated by the microphone 3 down from its very high sample rate, e.g. 3 Mhz, down to a preliminarily downsampled version 50' of the input signal at a lower sample rate such as 384 kHz, which provides a more tractable bandwidth. For instance the preliminary decimator may take the form of a divide-by-8 decimator to reduce the 3 MHz clock rate from the PDM microphone 3 to around 384 kHz. The preliminary decimator 4 also comprises a low pass or pass band filter disposed between the microphone 3 and the preliminary downsampler. This filter passes the audio band plus ultrasonic frequencies, including the frequency of the signal emitted by the ultrasound emitter 15, but which cuts out the higher frequencies prior to the preliminary downsampling.

Following the first stage decimator 4, the signal path is sent to two destinations: the audio band decimator 5 which comprises a low pass filter and audio-range downsampler; and the ultrasonic decimator 6, which comprises an ultrasonic band-pass filter and ultrasound-range downsampler.

The ultrasonic decimator 6 is arranged to receive the preliminarily downsampled input signal 50', and comprises an ultrasound-range downsampler arranged to further downsample the preliminary downsampled signal 50' to a lower sample rate, but one still high enough to retain the reflection of the ultrasound signal emitted by the ultrasonic emitter 15 (i.e. at least twice the frequency of the emitted ultrasound signal). The ultrasound decimator 6 also comprises an ultrasonic passband filter configured to extract the ultrasonic audio from the preliminary downsampled signal 50' prior to the ultrasound stage downsampling, discard the broadband audio. The ultrasonic passband filter of the ultrasound decimator 6 thus removes both the audio band frequencies and also removes any of the high frequency sigma-delta modulator noise remaining in the preliminarily downsampled input signal 50', thereby producing an ultrasound signal 56 in the desired ultrasound range. In embodiments the ultrasonic band-pass filter 6 has a configurable pass-band.

In addition, the audio decimator 5 is arranged to receive an instance of the same preliminary downsampled input signal 50', and comprises a low pass filter configured to extract the broadband audio, discarding the ultrasonic components. The audio decimator further comprises an audio band decimator 5 configured to further reduce the sample rate following the low pass filtering, in order to produce an audio signal 54 at the desired output sample rate, typically 16 kHz to 48 kHz (giving a Nyquist limit of 8 kHz to 24 kHz respectively, the latter being just about within the audible range for humans with exceptional hearing). The ultrasound decimator 6 downsampler to a rate lower than that of the preliminarily downsampled input signal 50' but higher than the audio signal 54.

Thus the audio decimator 5 is arranged to extract an audible-range audio signal 54 from the input signal 50, 50', and the ultrasound decimator 6 is arranged to extract an ultrasound signal 56 from the input signal 50, 50'. The audio decimator 5 is arranged to supply the extracted audio signal 54 to the controller 7 for processing, and the ultrasound decimator 6 is arranged to supply the extracted ultrasound signal 56 to the controller 7 to assist in the processing of the audio signal 54.

Note: in alternative embodiments, the preliminary downsampler stage 4 is not necessarily needed. It is preferred since, as explained previously, decimating in stages incurs a reduced computational complexity compared to decimating on one go. Nonetheless, reducing the computational complexity in this manner is not essential to all possible implementations, and instead each of the audio decimator 5 and ultrasound decimator 6 may be configured to downsample straight from the sample rate of the raw input signal 50 (e.g. 3 MHz) to the desired sample rate for the respective audio or ultrasound signal 54, 56. Furthermore, the use of decimators which also downsample as well as filtering is not essential. Other alternative or additional filtering techniques may be used to extract audio and ultrasound signals 54, 56 in the desired frequency bands (various filtering techniques in themselves being known to a person skilled in the art). Hence more generally, the audio downsampler 5 may be replaced by any audio filter, the ultrasound downsampler 6 may be replaced by any ultrasound filter, and the preliminary downsampler 4 (if used) may be replaced by any preliminary filter stage.

There are various processing operations that may be performed upon the audio signal 54 which may be assisted in various ways based on the ultrasound signal 56. Some of these will now be described by way of example with reference to FIGS. 2 to 5.

Figure 2:
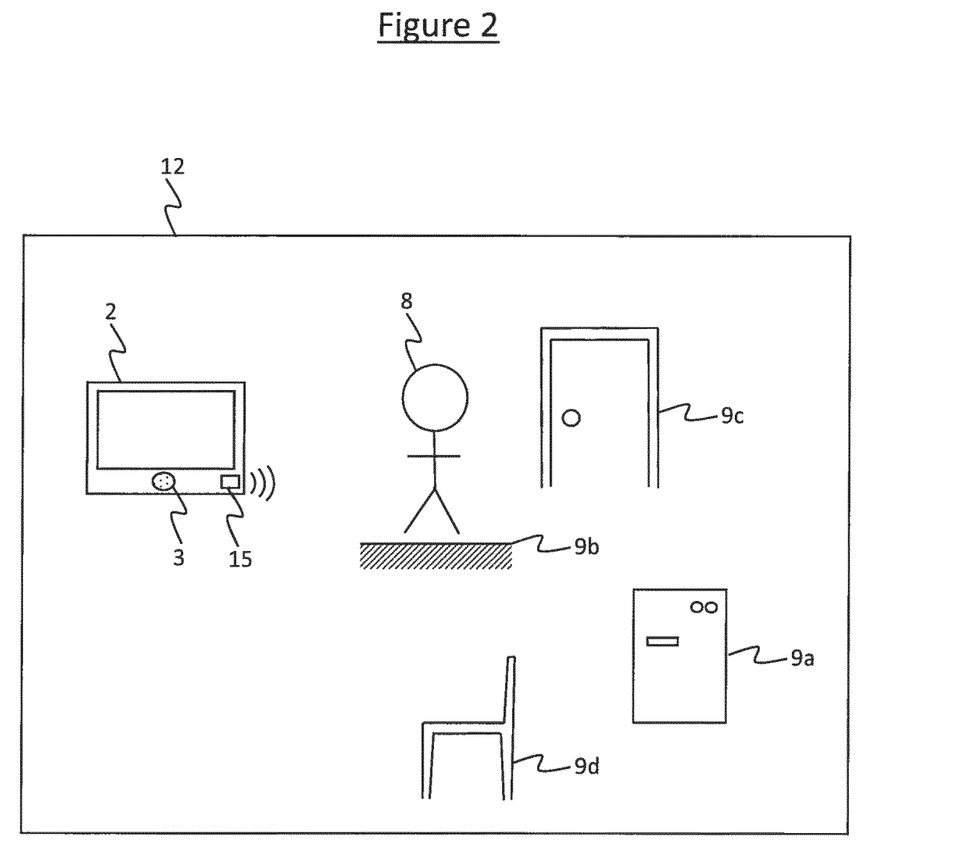
FIG. 2 is a schematic illustration of an environment such as a room.

FIG. 2 illustrates an example environment 12 in which the system (or at least the microphone 3 and ultrasound emitter 15) may be deployed. The environment 12 is also occupied by a user 8. The environment 12 may for example comprise a room of a building, such as a user's living room. In embodiments the system 4, 5, 6, 7, 15 is incorporated in a target device 2 such as a smart TV set which is deployed in the environment 12.

The microphone 3 is arranged to capture audio from the environment 12 including speech uttered by the user 8. The controller 7 is arranged to process the captured audio signal 54 in order to perform some useful function. For instance the controller 7 may be configured to apply a speech recognition algorithm to the captured audio 54 in order to recognise one or more voice commands spoken by the user 8 and to control the target device 2 based on the voice command(s), such as to wake up the target device 2 from a standby state in response to recognizing a predetermined wake-up word in the captured audio. The controller 7 may also be configured to apply a noise suppression algorithm and/or an echo cancelling algorithm to the received audio signal 54 in order to improve the chances of successful voice recognition. In some embodiments the functionality of the controller 7 responsible for recognizing voice commands may be part of a virtual digital assistant, such as a bot or voice controlled search engine, which may be installed on the target device 2 or hosted on a server comprising one or more server (or equivalently the server may be considered as the target). Note that the controller 7 is illustrated in FIG. 1 as a schematic block but may represent functionality implemented in one or more devices, applications, and/or hardware or software modules.

In alternative embodiments, the processing of the captured audio signal 54 need not be to recognize speech to control a target device 2 such as a television. For instance, the controller 7 may be arranged to process the captured audio signal 54 to be transmitted onwards over a packet-switched network (e.g. the Internet) to one or more remote user terminals (not shown) as part of a telephone call, e.g. a packet-switched voice call such as a VoIP call (Voice over Internet Protocol call). This processing may for example comprise applying noise suppression and/or echo cancelling to improve the perceived quality of the call for the far-end user(s) (not shown). In such embodiments, the system 4, 5, 6, 7, 15 may be incorporated into a user terminal for making voice calls, such as a speaker-phone unit, desktop or laptop computer, mobile phone, tablet, or smartwatch.

Whatever the application, the controller 7 is arranged to extract an ultrasound component 56 from the captured sound, and to use this to provide additional information to assist in the processing of the audio signal 54. The ultrasound signal emitted by the ultrasonic emitter 15 is pre-known to the controller 7 (it has a predetermined pattern or signature that the controller 7 is preconfigured to recognize). E.g. the emitted ultrasound signal may have a predetermined narrowband frequency and/or a predetermined pulse timing. Also, the ultrasound signal will be reflected back toward the microphone 3 from one or more objects and/or surfaces in the environment 12. Hence by recognizing the predetermined pattern or signature in the reflections of the emitted ultrasound signal received in the received ultrasound signal, the controller 7 is able to determine information about the environment 12, and to adapt the manner in which it processes the audio signal in dependence on this information. Some particular examples are described in the following.

Figure 3:
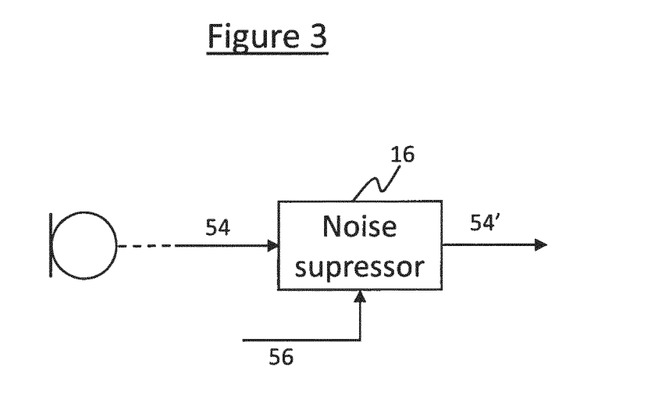
FIG. 3 is a schematic block diagram of a noise suppression subsystem.

In a first embodiment as illustrated in FIG. 3, the ultrasound signal 56 can be used to improve noise suppression.

The environment 12 will typically comprise one or more sources of background noise (i.e. ambient noise), e.g. a household appliance 9a such as a dishwasher, tumble dryer, fridge, or air conditioning. To mitigate this, the controller 7 may comprise a noise suppressor 16 (e.g. an algorithm implemented in software), wherein the noise suppressor 16 is arranged to receive the audio signal 54 and to filter it in order to produce a processed version 54' of the audio signal having at least some of the background noise from the environment 12 filtered out. The filtering is based on a noise model maintained by the noise suppressor 16, wherein the noise model is trained over time. For instance, spectral subtraction applied to noise suppression typically time averages the frequency components of ambient noise to from the environment to produce a noise profile for later subtraction.

In order to train the noise model, it is necessary to selectively enable and disable the training such that the model is only being trained when the audio signal 54 is classified as being only due to the background noise—i.e. there is no other audio activity going on that contributes significantly to the audio signal 54. If there is activity such as a user 8 walking on a wooden floor 9b or slamming a door 9c, such sounds should not be included in the noise profile of the environment 12 since they are irregular and fleeting. Hence classifying the audio as either signal or noise is a key part of a noise suppression subsystem 16.

As recognized herein, ultrasonic data can assist the noise suppression by improving the classification of noise and signal. Accordingly, in embodiments the controller 7 is configured to use the reflections of the ultrasound signal emitted by the emitter 15, as received in the received ultrasound signal 56, to provide information to classify or assist in the classification as to whether the current waveform in the audio signal 54 is likely to be due to some transient activity or whether it is more likely to be due to background noise. Particularly, the controller 7 is configured to use the reflections of the emitted ultrasound signal to detect motion in the environment 12 (e.g. in the room), and to thereby detect whether or not the current audio signal is accompanied by motion. For instance a motion detection system can be implemented using the reverb from a periodic ultrasonic pulse. Techniques to detect motion based on reflections of a predetermined ultrasound signal are in themselves known in the art, e.g. based on Frequency Modulated Continuous Wave (FMCW) techniques, or the Doppler effect.

Based on the motion detection, the controller 7 is configured to determine whether the audio signal 54 is currently accompanied by motion in the environment 12. If so, it is more likely that the audio signal 54 contains audio content that is due to the moving object—for example a user 8 walking across a wooden floor 9b, or a squeaky door 9c being opened or a door being slammed closed. Even if a person in the room 12 is only sitting "still" and, say, talking or listening to the radio, then he or she will still typically tend to fidget somewhat, allowing the speech or radio to be classified as not noise. On the other hand if the audio signal 54 is not currently accompanied by motion in the environment 12, then it is more likely to be due to background noise.

Accordingly, the controller 7 may be configured so that, when there is substantially no movement within the room, it classifies the audio signal 54 as background noise; but when more than a threshold degree of movement is present then it classifies the current audio signal 54 as signal (i.e. containing content), or increases the probability that the audio is signal. In embodiments the classification may also be dependent on one or more other known factors used in noise classification.

The controller 7 then selects whether or not to use the presently received audio signal 54 to train the noise suppression model used in the noise suppressor (i.e. whether to use this signal to teach it what the ambient noise in the environment 12 sounds like), wherein this selection is performed at least in part in dependence on the noise classification. If the controller 7 classifies the current audio signal 54 as essentially noise, then it allows the noise model to be trained. If on the other hand the controller 7 currently classifies the audio signal 54 as not noise, then it inhibits the training from occurring so that the noise model does not wrongly adapt to transitory activity or events occurring within the environment 12.

Figure 4:
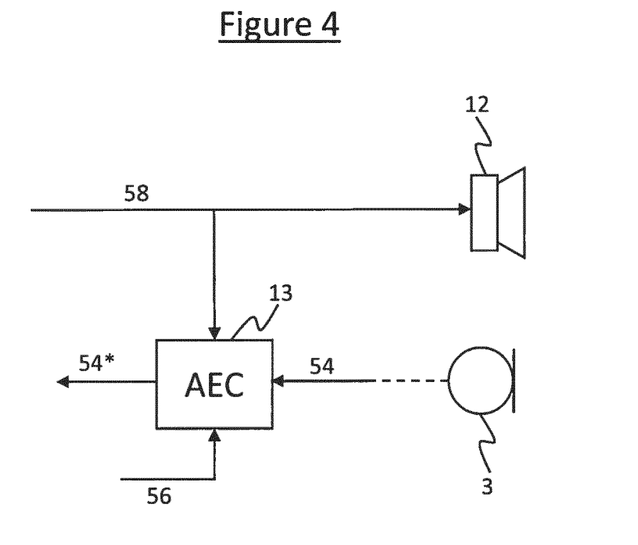
FIG. 4 is a schematic block diagram of an acoustic echo cancelling subsystem.
Figure 5:
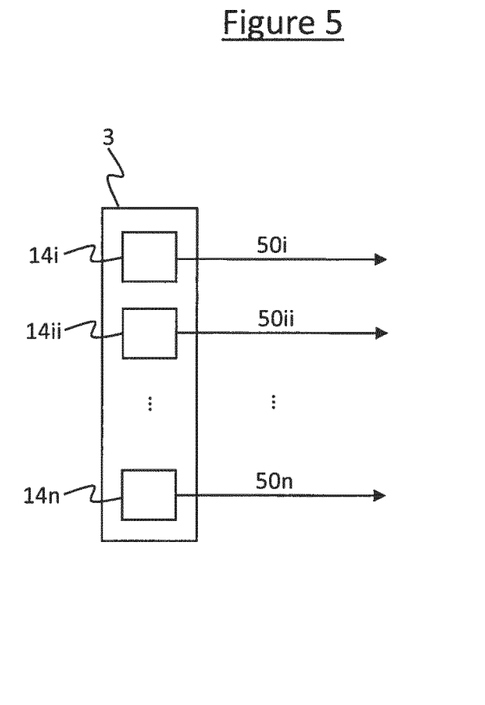
FIG. 5 is a schematic block diagram of a directional microphone.

In a second embodiment as illustrated in FIG. 4, the ultrasound signal may be used to improve acoustic echo cancellation (AEC).

As shown in FIG. 4, in embodiments the system also comprises at least one loudspeaker 12 arranged to play out an output audio signal 58, thereby emitting audible sound into the environment 12. For example, in the case where the system is incorporated in a smart TV set, the loudspeaker(s) 12 are arranged to play out the audio of the TV show or movie currently being watched by the user 8. However, this means that the emitted audio from the speaker(s) 12 will be reflected from one or more surfaces and/or objects in the environment (e.g. room) 12, back towards the microphone 3. This creates audible-range interference which will interfere with the ability of the controller 7 to pick out voice commands from the received audio signal. Hence it is desirable to filter out any echoes of the played-out audio signal 58 from the received audio signal 54 before speech recognition is applied. As another example, the system may comprise a user terminal for conducting a packet-switched voice call such as a VoIP call. In this case, the speaker(s) 12 may be arranged to play out the received audio stream 58 received from the far-end user, whilst the microphone 3 needs to capture only the near-end audio to transmit to the far-end user. If the microphone 3 picks up and transmits any echoes of the far-end audio signal 58 as well, then this will create an annoying artefact at the far end. Hence it is desirable to filter out any echoes of the far-end signal 58 from the received (near-end) audio signal 54 before it is transmitted to the far end.

Accordingly, in embodiments, the controller 7 comprises an acoustic echo canceller (AEC) 13 arranged to filter out echoes from the received audio signal 54. The filtering is based on an echo response model maintained by the AEC 13, wherein the echo cancellation model is trained over time.

One problem with AEC applied to audio data is that the AEC 13 has to constantly adapt its echo model in line with changes in the environment 12. For example, an occupant 8 may stand up and move an object 9d such as a chair, both of which will alter the echo impulse response of the room 12 and therefore require and adaptation of the echo model. Similarly if someone opens or closes a door 9c then this will change the impulse response of the room 12. To account for this, the AEC module 13 will try and adapt its echo model in order to optimally squash the signals. This is illustrated in FIG. 4. As shown, the AEC 13 is arranged to receive the received audio signal 54, and also to receive an instance of the played-out audio signal 58 which it filters according to the current echo response model of the environment 12 and then subtracts from the received audio signal 54 in order to produce a version 54* of the received audio signal with the echo cancelled therefrom. To train the echo response model, the AEC 13 is configured to adapt the model over time to hone in on a filter that makes the resulting signal 54* equal to zero.

However, changes to the environment 12 must be distinguished from somebody speaking, so that the model is only trained during periods when there is no audio source in the environment 12, e.g. when no person 8 in the environment 12 is talking (otherwise the model is wrongly being trained to subtract the sound from the local audio source 8 in the environment). This is normally the task of a 'double talk detector'. Nonetheless conventional doubletalk detectors are still prone to misclassifications.

It is recognized herein that ultrasonic data can assist in doubletalk detection. This aids in effectively distinguishing between the effects of doubletalk and a change in the room topology, since human speech contains very little or no ultrasound content. Hence a change in the ultrasound signal 56 is likely due to a change in the topology of the environment 12 affecting its echo response, whereas audio that is not accompanied by a change in the ultrasonic feedback is likely due to an audio source such as a human speaker 8 in the environment 12.

As mentioned, over time the echo model in the AEC 13 adapts such that the output 54* of the AEC converges to a quiescent state during periods of silence in the environment 12. If there is a change in the echo response of the environment 12, then the filter in the AEC 13 will no longer correctly model the environment (e.g. room) 2, and so when its filtered version of the output audio signal 58 is subtracted from the received audio signal 54, this will result in a non-zero output 54*. If allowed to continue adapting, the AEC 13 will subsequently begin to adapt the echo model to represent the new echo response, and therefore adapt the filtering so that over time the output 54* of the AEC 13 will converge back to quiescence.

However, the system needs to distinguish whether the divergence is indeed due to a change in the echo response of the environment 12, or in fact whether it is due to an actual audio source making sound in the environment 12, such as a human 8 speaking (doubletalk). The model in the AEC 13 should not be adapted when the divergence is due to the latter, as this does not represent a change in the echo response of the environment 12 but rather audio activity originating in the environment 12. Existing doubletalk detectors attempt to do this but are prone to misclassifications.

To address this, in embodiments the controller 7 is configured to detect whether the reflections of the predetermined ultrasound signal emitted by the ultrasound emitter 15, as received back in the received ultrasound signal 56, are indicative of a change in the topology of the environment (e.g. room) 12 and therefore a change in the echo response of the environment 12. Then, if there is a divergence from zero in the output 54* of the AEC 13, the controller 7 uses the reflected ultrasound to classify whether the divergence is likely due to a change in the room topology or due to an audio source such as a human speaker 8 present in the environment. If the former, the controller 7 classifies the divergence as due to a change in echo response and therefore allows the adaptation of the echo model to continue; but if the latter, the controller 7 classifies the apparent divergence as due to "doubletalk" and temporarily disables the echo model adaptation for the duration of the doubletalk.

In embodiments, this may be achieved by running the AEC on the ultrasound component. With little or no ultrasonic content in human speech, this means any adaptation in the ultrasonic AEC indicates a change in the echo impulse response of the environment 12 that should also trigger an adaptation in the wide-band audio AEC 13 (or at least increases the probability of classifying as due to change in echo response and thereby triggering an adaptation). In embodiments the classification may also be dependent on one or more other known factors used in doubletalk detection.

In a third embodiment, the reflected ultrasound signal 56 may be used to improve the detection of a wake-up-word. This applies in embodiments where the controller 7 is used to wake up a target device 2 such as a smart TV or a smartphone from a standby state. The standby state is a state in which at least one function of the target device 2 is on standby, or at least one function accessed by the target device 2 from a server is on standby, and the waking up comprises waking up the at least one function.

A wake-up word is typically employed by an audio system to establish that the user 8 wishes to engage with the system. It is called a wake-up word because the system will not be engaged until the word is heard by the system. For instance, in the case of a voice controlled system, the system will (not be listening in for further commands or queries until the wake-up word is spoken. Upon detecting the wake-up word, the system will wake-up (usually showing some audio or visual response to indicate this), and then begin listening for a query or command that can be interpreted by a natural language processing subsystem that may be implemented locally in the target device 2 or in the cloud. In this case, the purpose of the wake-up word is to avoid that the system misinterprets other words in the user's conversation as commands or queries to the system.

For instance, the target device may comprise a smart TV or set-top box, or some other smart household appliance such as stereo or oven, which is able to be controlled by voice commands. In the standby state, the TV or appliance will not respond to any voice command other than the wake-up word, until the wake-up word has been spoken. As another example, the target device 2 may take the form of a mobile user terminal such as a smartphone, tablet or smartwatch, installed with a virtual digital assistant (VDA) or more likely arranged to access a VDA from a server (not shown). E.g. the VDA may comprise a bot or voice-based search engine. In such cases, the VDA may be configured so as not to respond to any other voice commands or queries other than the wake-up word unit the wake-up word has been spoken. As another example the target device 2 may comprise a robot, such as a household robot assistant or pet. In this case the wake up could comprise waking up a VDA installed on the robot or waking up the robot itself.

However, a problem with wake-up words is that there tend to be 'false positives'. That is, the system may have incorrectly detected that the wake-up word was spoken, and start to listen in for commands or queries. This is disconcerting to the end-user 8, as they did not mean to engage with the system, and did not mean for the system start listening in on a conversation. For instance the user 8 may be surprised or annoyed to hear or see the audio or visual indication that the system has woken up. And/or, as the system is now monitoring the user's conversion without the user 8 intending to have engaged with the system, the system may now start detecting one or more words in the user's conversation as being commands or queries. This can lead to unexpected behaviour of the system.

For instance, in the case of a smart TV, if the TV's voice detection has inadvertently woken up and then the user 8 says to his or her friend in the room "You should have seen that program on channel 1 last night", then this may cause the TV to unexpectedly switch on to channel 1. Or if the target device 2 comprises a smart device such as a smartphone, tablet or smart watch using a voice controlled search engine, then if the user says to his or her friend "Where's a good restaurant near here?" this may cause the search engine to visually or audibly output a search result or results in response to this query, even though the query was directed to the friend and not the search engine on the smart device.

To address this, the controller 7 may be configured to only declare a positive detection of the wake-up word on condition that it is accompanied by a predetermined gesture in the environment 54, as detected using the reflections of the emitted ultrasound signal received in the received ultrasound signal 56. The controller 7 is configured to apply a speech recognition algorithm to the audio signal 54 (e.g. based on natural language processing techniques) in order to monitor for the wake-up word. Furthermore, the controller 7 is configured to use the ultrasound signal 56, being a reflection of the emitted ultrasound signal, to detect motion in the environment 12 and to thereby monitor for a gesture performed by the user 8. As mentioned previously, ultrasound reflections can be used to detect motion based on any of a number of techniques which in themselves are known in the art, e.g. FMCW or the Doppler effect. Furthermore, gesture detection based on such techniques, in itself, is also known in the art for the purpose of providing gesture based user interfaces. Therefore the detection of motion based on the reflected, received ultrasound signal 56 can be used by the controller 7 to detect a gesture performed by the user 8.

The controller 7 will then only declare a positive detection of the wake-up word, and therefore will only wake up the target device 2 from the standby state (e.g. in order to listen for further voice commands and/or queries), on condition that the apparent detection of the wake-up word in the audio signal 54 is accompanied by a specific user gesture or one of a predetermined set of specific user gestures as detected based on the ultrasound signal 56. Otherwise, the controller 7 will leave the target device 2 in the standby state. Thus, a positive detection of the user's intent is only declared and the system is only woken up if the apparent detection of the wake-up word is accompanied by a suitable gesture indicating that the user's intent is indeed to wake up the system. Note that in embodiments, the required gesture need not necessarily be an explicit gesture by the user 8. Rather, in embodiments, the controller 7 may be configured to allow wake-up based on detecting a gesture that implicitly signals the user's intent, such as turning his or her head toward the target device 2. Alternatively or additionally, the controller 7 may be configured to enable wake-up on condition of an explicit user gesture such as waving a hand.

In a fourth embodiment, the ultrasound signal 56 may be used to improve detection of the direction-of-arrival of the audio captured in the audio signal 54.

In various applications it is useful to detect the direction of arrival of an audio signal, such as to detect the direction of a person 8 speaking a speech command. Direction of arrival involves finding the angle of the signal, including a lot of noise in the audio spectrum. As recognized herein, a reflected ultrasonic signal 56 can be used to identify a potential sound source such as somebody making a gesture in the room 12, and thereby provide information to infer the likely location of the source, e.g. somebody giving a speech command and implicitly or explicitly gesturing at the same time.

FIG. 4 illustrates a directional microphone suitable for detecting the direction of arrival of an audio signal. In this case, the microphone 3 comprises an array of individual sound sensing elements 14$i$ . . . 14$n$ spaced apart with predetermined spatial offsets relative to one another. In such embodiments each sound sensing element 14$i$ . . . 14$n$ is arranged to output its own respective sub-signal 50$i$ . . . . 50$n$, being a respective instance of the sound signal captured from the environment 12, each captured from a slightly different position in space. As will be familiar to a person skilled in the art, it is possible to detect the direction of arrival of sound based on the relative amplitudes and/or phases of the sub-signals 50$i$ . . . 50$n$ captured by the individual microphone elements 14$i$ . . . 14$n$ of a directional array. This in itself can be implemented using known techniques.

According to embodiments disclosed herein, each of the sub-signals 50$i$ . . . 50$n$ captured by the individual microphone elements 14$i$ . . . 14$n$ is passed through the above-described filters 4, 5, 6 in order to produce a respective audio sub-signal 54$i$ . . . 54$n$ and a respective ultrasound sub-signal 56$i$ . . . 56$n$. For instance, each of the sound sensing elements 14$i$ . . . 14$n$ may take the form of a PDM microphone producing a respective 1-but signal at high frequency, e.g. 3 MHz, from which the preliminary decimator 4 and audio decimator 5 extract a respective audio sub-signal, and from which the preliminary decimator 4 and ultrasound decimator 6 extract a respective ultrasound sub-signal.

The controller 7 is configured to then use the relative phases and/or amplitudes of the audio sub-signals 54$i$ . . . 54$n$ to estimate a direction of arrival of the audio signal 54. However, due to noise in the audio signal, such a detection on its own is prone to error. Therefore to improve the chance of an accurate direction-of-arrival estimation, the controller 7 is also configured to use the relative phases and/or amplitudes of the ultrasound sub-signals 54$i$ . . . 54$n$ to estimate the position of a sound source such as a person 8 in the environment 12.

For example, the controller 7 may be configured to use motion detection based on the reflected, received ultrasound signal 56 in order to detect the location of motion in the environment 12. For instance a user 8 may perform an explicit gesture such as waving when speaking a voice command, or may make an implicit gesture such as turning his or her head toward the target device 2.

If the controller 7 detects this gesture or motion at the same time as detecting a voice command 8 from the user 8 in the audio signal 54, and if the direction of the audio command 54 as detected based on the audio sub-signals 54$i$ ... $n$ approximately coincides with the direction of the gesture or motion as detected based on the ultrasound sub-signals 56$i$ ... $n$, then the controller 7 can use this fact to increase the confidence level of declaring a positive detection of the voice command and/or to refine the estimated direction of arrival.

Even if no gesture is made per se, a speaking user is rarely completely still and so if this motion can be detected, that this provides additional information to the controller 7. As another example, the controller 7 may be configured to maintain a record of the shape of the room 12. If it detects a change in the shape of the room 12, this is a candidate for the source of the audio signal 54. In general, for any audio source where motion or a change in the environment 12 is likely to accompany emission of a sound by the audio source, then the reflected ultrasound signal 56 may be used to improve detection of the direction of arrival of the audio signal 54.

In embodiments, the ultrasound signal 56 can provide a better estimation of direction-of-arrival than the audio signal since in embodiments the received ultrasound signal is a narrowband signal capturing a narrowband ultrasound signal emitted by ultrasonic emitter 15, whereas the audio signal 54 is a wideband audio signal encompassing a wide audio frequency range which will tend to include a lot of noise and/or one or more sources of interference.

It will be appreciated that the above embodiments have been described by way of example only.

For instance, note that the first to fourth embodiments above are not exclusive of one another. For example, the echo cancellation 13 may be applied to the output of the noise suppressor 16 or vice versa, in order to produce a version of the audio signal 54 with both echoes cancelled and noise suppressed. Also, the echo cancellation and/or noise suppression may be combined with the improved wake-up word detection, and/or direction of arrival detection.

Further, the techniques disclosed herein may be applied to other applications other than speech recognition for controlling a target device, and other than processing the audio for transmission in a VoIP call or the like. More generally the techniques disclosed herein may be applied in any scenario where it is desired to remove noise or echo from an audio signal, or to detect a particular wake-up word or event in the audio signal, or to detect a direction of arrival of an audio signal, or to perform any other processing of the audio signal that may depend on any property of the environment 12 that can be detected through ultrasound reflections.

Further, other types of microphone may be used other than a PDM microphone. A PDM microphone may be preferred due to the fact that it gives an acceptable quality for a low cost and is typically incorporated in many consumer devices, but other types of microphone are available to a person skilled in the art.

Furthermore, it is not essential in all possible aspects disclosed herein to use the same microphone 3 to capture both the ultrasound and audio components 54, 56. This may be preferred so as to advantageously re-use part of the front-end of the sound sensing equipment of the system, but in alternative realizations of the noise suppression, echo cancelling, wake-up word detection and direction of arrival detection techniques disclosed herein, a separate ultrasound microphone may be used to capture the ultrasound signal 56 as long as it is co-located with the audio microphone.

Other variants and applications of the disclosed teachings may be apparent to a person skilled in the art given the disclosure herein. The scope of the present disclosure is not limited by the above-described embodiments, but only by the accompanying claims.

The invention claimed is:

1. A system comprising:
   an ultrasound emitter configured to emit an emitted ultrasound signal into an environment;
   sound sensing equipment comprising a microphone or more than one co-located microphone, wherein at least one of the one or more microphones of said sound sensing equipment is arranged to capture from said environment a received audio signal comprising a component in a human audible range, and wherein at least one of said one or more microphones of the sound sensing equipment is arranged to capture a received ultrasound signal comprising reflections of the emitted ultrasound signal; and
   a controller configured to perform operations of:
   monitoring for one or more predetermined wake-up words in the received audio signal;
   waking up a target device from a standby state in response to a positive detection of at least one of the one or more wake-up words; and
   performing a gesture detection process, by using the ultrasound signal to detect the reflections of the emitted ultrasound signal and thereby detect user gestures performed by a user in said environment;
   wherein the controller is configured to determine whether the received audio signal is a wake-up word or background noise, by making a determination as to whether the received audio signal is accompanied by a user gesture, as detected based on said gesture detection process, and declaring the positive detection of the at least one wake-up word in at least partial dependence on said determination that the received audio signal is accompanied by a user gesture.

2. The system of claim 1, wherein the sound sensing equipment comprises:
   an audio filter arranged to receive and filter an input signal from the one or more microphones to produce the received audio signal representing the audio component by passing a first frequency range comprising the audio component but filtering out higher frequencies; and
   an ultrasound filter arranged to receive and filter an instance of the same input signal derived from the same microphone as the audio filter to produce the received ultrasound signal comprising the ultrasound reflections by passing a second frequency range comprising the ultrasound component but filtering out lower frequencies including at least the audio component.

3. The system of claim 2, wherein:
   the audio filter takes the form of an audio decimator which is also arranged to downsample the input signal to an audio sampling frequency retaining the first frequency range but not higher frequencies, thereby producing said received audio signal at the audio sampling frequency.

4. The system of claim 2, wherein the ultrasound filter is also arranged to filter out frequencies higher than the second frequency range.

5. The system of claim 4, wherein the ultrasound filter takes the form of an ultrasound decimator which is also arranged to downsample the input signal to an ultrasound sampling frequency retaining the second frequency range but not higher frequencies, thereby producing said received ultrasound signal at the ultrasound sampling rate.

6. The system of claim 4, wherein the ultrasound filter has a configurable pass band.

7. The system of claim 2, wherein:
the input signal initially includes frequencies higher than the second frequency range, comprising high frequency noise; and
the system comprises a preliminary filter arranged to filter the input signal before input to the audio and ultrasound filters, by passing the first and second frequency ranges but to filter out at least some of the high frequency noise.

8. The system of claim 7, wherein the preliminary filter takes the form of a preliminary decimator which is also arranged to downsample the input signal to an initial downsampled sampling frequency before input to the audio and ultrasound filters, the initial downsampled sampling frequency retaining said first and second frequency ranges but not a higher frequency range comprising at least some of said high frequency noise.

9. The system of claim 1, wherein the controller is configured to process the received audio signal to be transmitted as part of a voice call.

10. The system of claim 1, wherein the system is incorporated in the target device.

11. The system of claim 1, wherein the target device takes the form of one of:
a television set or set-top box,
a smart household appliance,
a mobile user terminal,
a desktop computer,
a server, or
a robot.

12. The system of claim 1, wherein the controller is configured to:
apply a noise model in order to remove ambient noise from the received audio signal, the noise model modelling ambient noise originating from said environment;
perform a motion detection process, by using the received ultrasound signal to detect the reflections of the emitted ultrasound and based thereon to detect motion in the environment;
perform a noise classification to classify whether or not the received audio signal currently consists only of ambient noise, by classifying the received audio signal as ambient noise at least partially in dependence on not being accompanied by motion in the environment as detected based on said motion detection process; and
train the noise model based on the received audio signal during periods when the received audio signal is classified as ambient noise according to said noise classification, but suppressing the training during periods when the received audio signal is not classified as ambient noise according to said noise classification.

13. The system of claim 1, wherein the system further comprises a sound source, and wherein the controller is configured to:
apply an echo model in order to remove echoes of the sound source from the received audio signal, thereby producing an echo-cancelled version of the received audio signal, the echo model modelling an echo response of said environment;
when the echo-cancelled version of the audio signal diverges from quiescence, perform an echo response classification to classify whether or not the divergence is due to a change in the echo response of the environment, by classifying the divergence as being due to a change in the echo response at least partially in dependence on being accompanied by a change in the reflections of the emitted ultrasound signal received in the received ultrasound signal; and
train the echo model based on the received audio signal during periods when the divergence is classified as being due to the as due to a change in the echo response according to said echo response classification, but suppressing the training during periods when the divergence is classified as not due to a change in the echo response according to said echo response classification.

14. The system of claim 1, wherein the microphone takes the form of a directional microphone comprising an array of sound sensing elements, and wherein the controller is configured to:
based on the array of sound sensing elements, determine a direction of arrival of the received ultrasound signal; and
determine a direction of arrival of the received audio signal at least partially based on the direction of arrival of the received ultrasound signal.

* * * * *